ABSTRACT

United States Patent [19]
Kuhn et al.

[11] Patent Number: 4,812,057
[45] Date of Patent: Mar. 14, 1989

[54] GUIDANCE SYSTEMS ON MACHINES

[75] Inventors: Siegfried Kuhn, Dürnau; Peter-Jürgen Kreher, Göppingen, both of Fed. Rep. of Germany

[73] Assignee: Boehringer Werkzeugmaschinen GmbH, Göppingen, Fed. Rep. of Germany

[21] Appl. No.: 5,036

[22] PCT Filed: May 2, 1986

[86] PCT No.: PCT/EP86/00259
§ 371 Date: Jan. 5, 1987
§ 102(e) Date: Jan. 5, 1987

[87] PCT Pub. No.: WO86/06666
PCT Pub. Date: Nov. 20, 1986

[30] Foreign Application Priority Data

May 6, 1985 [DE] Fed. Rep. of Germany ....... 3516238

[51] Int. Cl.$^4$ .............................................. F16C 29/02
[52] U.S. Cl. ..................... 384/42; 384/907.1
[58] Field of Search .................. 384/7, 15, 26, 37, 42, 384/907.1, 910

[56] References Cited

U.S. PATENT DOCUMENTS

| 2,253,846 | 8/1941 | Cornell | 384/15 |
| 2,322,972 | 6/1943 | Rumpf. | |
| 2,602,709 | 7/1952 | Wheildon, Jr. | 384/42 |
| 2,624,097 | 1/1953 | Kistler | 384/907.1 X |
| 2,998,397 | 8/1961 | Riesing | 384/910 X |
| 3,403,947 | 10/1968 | Johnson | 384/15 |
| 4,622,194 | 11/1986 | Rogers | 384/42 |

FOREIGN PATENT DOCUMENTS

| 57-61437 | 4/1982 | Japan. |
| 163820 | 9/1983 | Japan. |
| 45013 | 12/1963 | Luxembourg. |
| 634243 | 1/1983 | Switzerland. |

Primary Examiner—Thomas R. Hannon

[57] ABSTRACT

The present invention relates to a guidance system on a machine, especially a machine tool, consisting of a twist-resistant, vibratioin damping support body, of concrete for example, and at least one body fastened thereon or integrated therein, which is not of itself twist-resistant, and which forms the guidance ways. In order to endow such guidance ways with minimal thermal expansion and elasticity, make them very hard, give them good low-lubrication running characteristics, and enable them to be manufactured simply and very accurately, the body forming the guidance ways consists of sinterable nonmetals, especially ceramic material.

1 Claim, No Drawings

GUIDANCE SYSTEMS ON MACHINES

BACKGROUND OF THE INVENTION

The invention relates to a guidance system on a machine, especially a machine tool, consisting of a twist-resistant, vibration damping support body, of concrete for example, and at least one body forming the guidance ways, which is fastened thereon or integrated therein and which by itself is not twist-resistant.

In a machine which generally transforms or transports goods with the aid of the input mechanical energy, the individual units of the machine are moved relative to one another by displacing them along the course of guides. In a machine tool, for example, the workpiece holding tools and tool holders, powered or not, saddles and cross slides, tailstock, steady rests, and the like are movable relative to one another or relative to the machine frame, so that within a range established by the size of the machine, each position of the individual units relative to one another can be reached at any time and as often as desired by a repeatable, precise movement of individual units in order to permit the desired machining of the workpieces. These movable units are displaced along ways which, for the defined movement of the movable units, are to be as close as possible to a certain geometrical figure, usually a straight line or a plane.

This can normally be achieved only by precision machining, such as grinding and scraping. The guidance ways consist usually of steel or gray cast iron, and in some cases they are made of naturally occurring, hard minerals such as marble, for example, and can be made either from the same material as the part of the machine that bears them or of some other material, and the ways and machine base can be made either in one piece or can be assembled from a plurality of parts. In addition to steel and gray iron, concrete and plastic laminates are also used as materials for the machine base. The base of machine tools must be stable enough to prevent or minimize deformations of the guidance paths by the forces occurring in the operation of the tools.

The materials used for making the guidance ways and, as described, in some cases for the machine base, have a number of undesirable properties:

The first forming of the metal materials does not as yet yield surfaces accurate enough for use as guidance ways. Consequently a complex machining of the guidance ways is needed, for example milling, grinding and scraping, in order to obtain a surface that comes close enough to the ideal geometrical surface. This machining is very expensive on account of the great deal of time it requires and the great number of rejects that result.

A controlled and precise movement of the movable units of the machine on the guidance ways without requiring excessive driving force is possible only if the friction between the guidance ways and the parts to be displaced thereon is kept as low as possible. The lubrication between the ways and the part by means of oil or other lubricants that is required for this purpose is nevertheless unable to overcome the high starting friction at the beginning of the relative movement and cannot prevent damage to the ways if the lubricant system fails, due to the poor frictional properties of steel and gray iron materials. The static friction, which in spite of lubrication is substantially higher than the dynamic friction in these materials, is undesirable, since it greatly interferes with frequent, short movements.

The great thermal expansion of the metal materials used constitutes a problem, because in the event of temperature changes the relative positions of the individual units of the machine can vary.

The elasticity of steel and gray iron is a disadvantage because in the event of repeated stress and relief, such as can occur in machining operations, vibrations can build up on the guidance ways and in the machine frame, which when transmitted to the individual units of the machine tool can have a negative influence on the dimensional accuracy and surface quality of the finished workpiece.

Another disadvantage is wear when these materials are used in the guidance ways, which results from excessively low hardness of the materials combined with the great stresses that occur, insufficient chemical resistance and poor low-lubrication running characteristics. In the actual operation of a machine tool it is hardly possible to entirely avoid the complete or partial failure of the lubrication system or the action of coolants and lubricants containing moisture or acid, and dirt particles, especially grinding dust, on the guidance ways.

Further reduction of the dimensions and hence also of the weight of the guidance ways and thus also of the machine is not possible, since they are defined by the ability of the materials to withstand pressure.

The invention is directed to the object of providing a machine of the kind described above with guidance ways which have the lowest possible thermal expansion and elasticity, are very hard, have good characteristics for running with low lubrication, and can be manufactured simply and very accurately.

SUMMARY OF THE INVENTION

The invention is characterized in that the body forming the guidance ways consists of sinterable nonmetals, or non-metallic sintered material, especially ceramic material.

Desirable further developments of the invention consist in that body forming the guidance ways consists of a non-metallic, sintered material other than ceramic; or of a non-metallic material especially stone or glass; or a metallic, sintered material; or that a material is used for the machine bed, whose grain size differs from that of the sinterable nonmetal, especially ceramic material, less than the grain size of steel or gray cast iron.

The guidance ways of the machine are manufactured from sinterable nonmetals, or non-metallic sintered material.

Since workpieces sintered from ceramic material can be made with extreme accuracy from the outset, expensive and time-consuming mechanical or thermal finishing operations such as hardening, grinding, scraping, etc., are eliminated.

In ceramic guidance ways the lubrication of the ways is also desirable for the purpose of reducing the work of displacing the individual units along the ways, but any failure of the lubricating system has less severe consequences than when metal materials are used for the guidance ways, since the low-lubrication running characteristics of the ceramic material are much better due to the very fine pockets present in the material in which a residue of lubricant is present even if the lubrication system fails, and the great hardness of the material, which is virtually immune to wear.

Also the static friction, as well as the difference between static friction and dynamic friction, are less on account of the above-described circumstances, than in the materials heretofore used in guidance ways.

The thermal expansion of the ceramic material is so low that even in very long guidance ways no change in the relative positions of the individual units of the machine tool occurs which might affect the dimensional accuracy of the workpiece being produced.

The very low elasticity of the ceramic prevents the occurrence of vibrations and resonance.

The great hardness of the material prevents any attrition or wear of the guidance ways in the operation of the machine tool, even if lubrication is insufficient. Thus the otherwise so greatly feared contamination of the ways or of the lubricant loses importance. Especially in grinding machines the never entirely avoidable deposit of grinding dust on the guiding ways has resulted in the grinding of the dust into the surfaces of the ways by the operation of the machine tool, resulting in increased friction in the movement of the units of the machine tool, as well as a reduction in the dimensional accuracy in the positioning of these units.

Since the ceramic material is also highly resistant to oxidizing agents, it is not objectionable for the ways to come in contact with aqueous coolants and slightly acidic lubricants.

Since the surface pressures which ceramic is capable of withstanding are substantially higher than those of steel or gray cast iron, the stresses that occur are absorbed by substantially smaller areas—assuming that the support provided by the machine bed is sufficient—so that smaller structural dimensions and hence also lower weight are possible both in the guidance ways and in the entire machine bed for the same loading.

Not least in importance is the advantage of the ceramic material that it has a grain size which comes substantially closer to the grain size of the concrete—a possible material for the machine bed—than does the grain size of gray cast iron or steel. Thus it is possible when cementing or casting the guide ways of ceramic in place to achieve a substantially better bond with a machine bed of concrete than can be achieved in the cementing or casting-in-place of materials of greatly different grain sizes.

We claim:

1. A guidance system on a machine tool comprising: a twist-resistant, vibration damping support body of concrete, and at least one body forming guidance ways, said at least one body being cemented onto or cast into said support body, being non-twist-resistant, and consisting of ceramic material, the support body having a grain size differing from that of the ceramic material less than steel or gray cast iron, whereby a substantially better bond between said at least one body and said support body is achieved than with steel or gray cast iron.

* * * * *